Oct. 24, 1950        M. J. ROSE        2,526,690
ELECTRIC MOTOR SYSTEM
Filed May 24, 1949        6 Sheets-Sheet 1
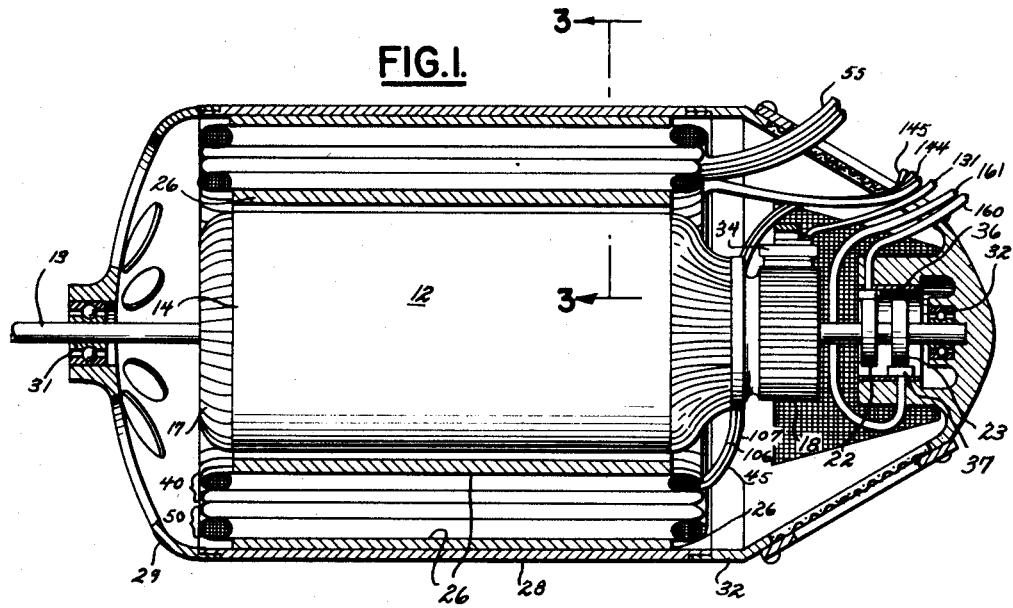
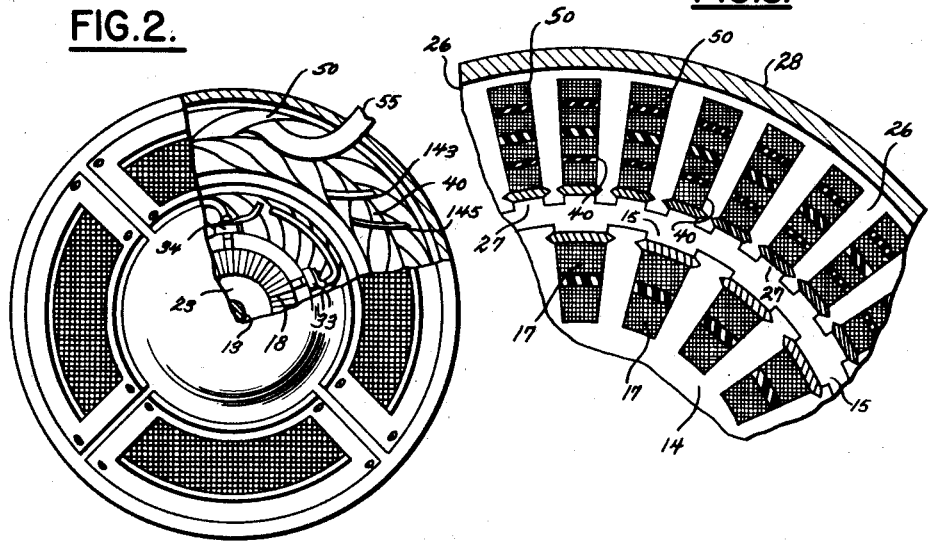
INVENTOR.
Martin J. Rose
BY
Attorney Oct. 24, 1950   M. J. ROSE   2,526,690
ELECTRIC MOTOR SYSTEM
Filed May 24, 1949   6 Sheets-Sheet 2

INVENTOR.
Martin J. Rose
BY
Attorney

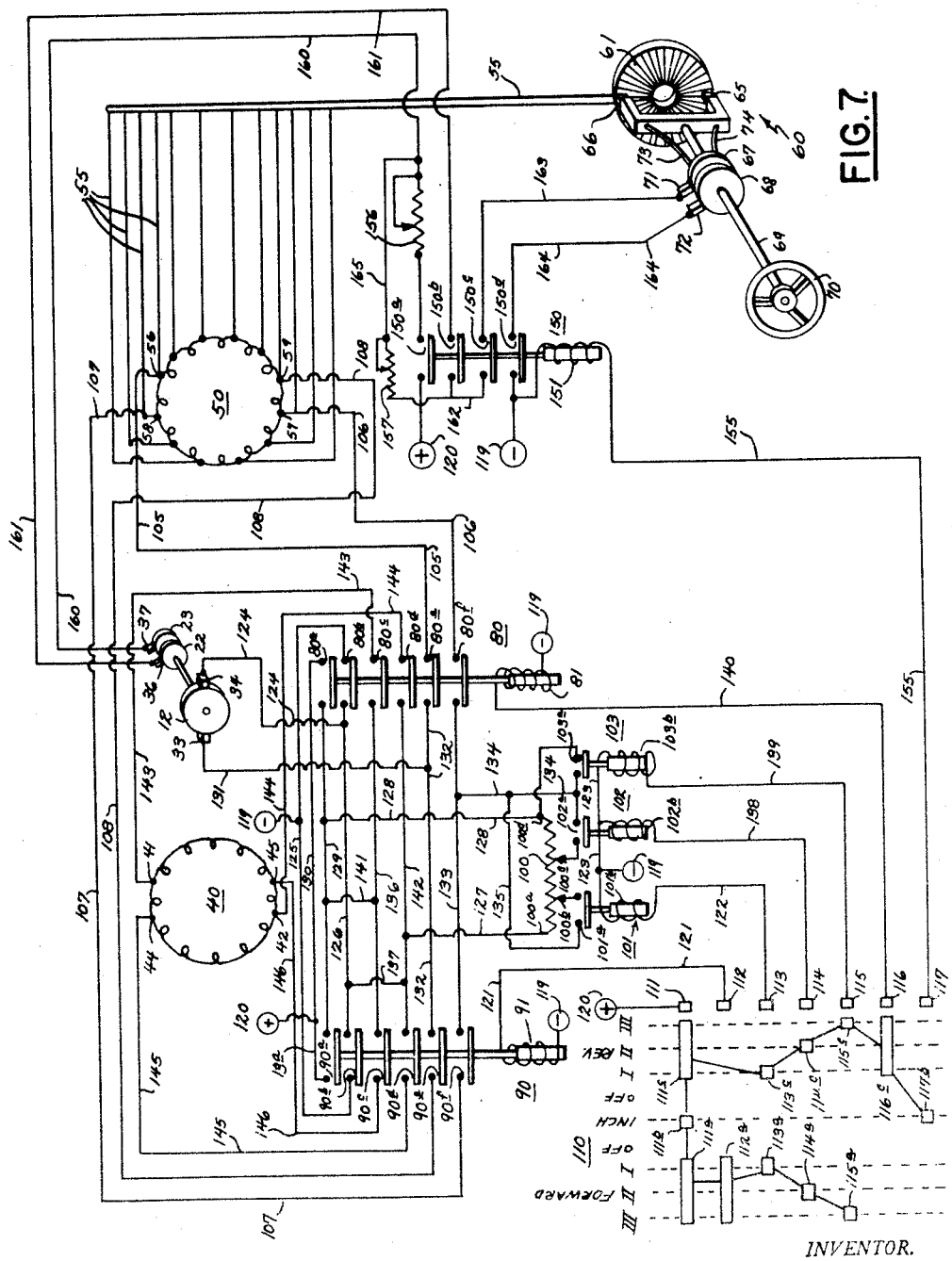

Patented Oct. 24, 1950

2,526,690

UNITED STATES PATENT OFFICE 2,526,690

ELECTRIC MOTOR SYSTEM

Martin J. Rose, San Francisco, Calif.

Application May 24, 1949, Serial No. 95,132

5 Claims. (Cl. 318—27)

(Granted under the act of March 3, 1883, as amended April 30, 1928; 370 O. G. 757)

The present invention relates to electric motor systems and more particularly to an electric motor system in which the armature rotation and the armature position are determined by the position of a remote controller.

The present invention is particularly directed to a motor system which selectively operates at a plurality of rotational speeds in both forward and reverse directions or positions the armature in accordance with the angular position of a controller located at a distance from the motor and its connected load.

The motor of the present invention operates in either direction at any of a plurality of speeds, and possesses the added feature of rotating in step with a hand wheel which the operator turns with very little physical effort. Such a motor system is applicable to the antenna of a radar set, a crane for handling massive delicate parts, or to adjusting the rolls of a steel rolling mill.

Motor systems to accomplish the above functions which have been available in the past are very complex usually requiring the use of electronic tubes and associated equipment. These systems are therefore comparatively fragile and are both heavy and bulky, which limitations are difficult to accommodate on shipboard and especially on combat vessels which are necessarily crowded and subjected to shocks and vibration.

The motor system of the present invention does not employ electronic tubes, transformers, or similar devices which are subject to failure under rough service, and is hence both compact and rugged. The motor employed has a direct current armature of conventional design to which is connected a pair of slip rings so that energization of the armature by means of the slip rings produces an electromagnetic rotor having fixed magnetic poles. The field structure is composed of a plurality of coils inserted in slots similar to the construction of induction motor stators and produces a non-salient pole field. The field is composed of two separate and distinct windings which are inserted in the same slots, one of which functions as a shunt field while the other has the dual functions of a series field and of producing a multi-pole "inching" field in which the angular position of the poles relative to the armature may be shifted by means of a manually controlled commutator switch located for the convenience of the operator of the system. It will be readily understood that the armature when energized through the slip rings constitutes an electromagnetic rotor which will align its poles with the poles created by the inching field, so that the angular position of the rotor may be adjusted by movement of the manually operated commutator.

An object of the present invention is to provide an electric motor system in which the motor may be continuously rotatable at several speeds in either direction or may be rotated to a desired angular position by means of a remotely located manual controller.

A further object is to provide an electric motor which may be utilized to continuously drive a mechanical load in either direction and to accurately adjust the angular position of the load by means of an easily manipulated controller.

Further objects and advantages of the present invention will be made apparent by reference to the present description and the annexed drawings wherein like reference numerals throughout the various views designate like parts and in which:

Fig. 1 is a sectional view of the motor employed in the present invention;

Fig. 2 is a plan view of the front end of the motor, partly in section;

Fig. 3 is a partial cross-sectional view of the stator and armature cores;

Fig. 7 is a wiring diagram of the motor system.

Figure 4:
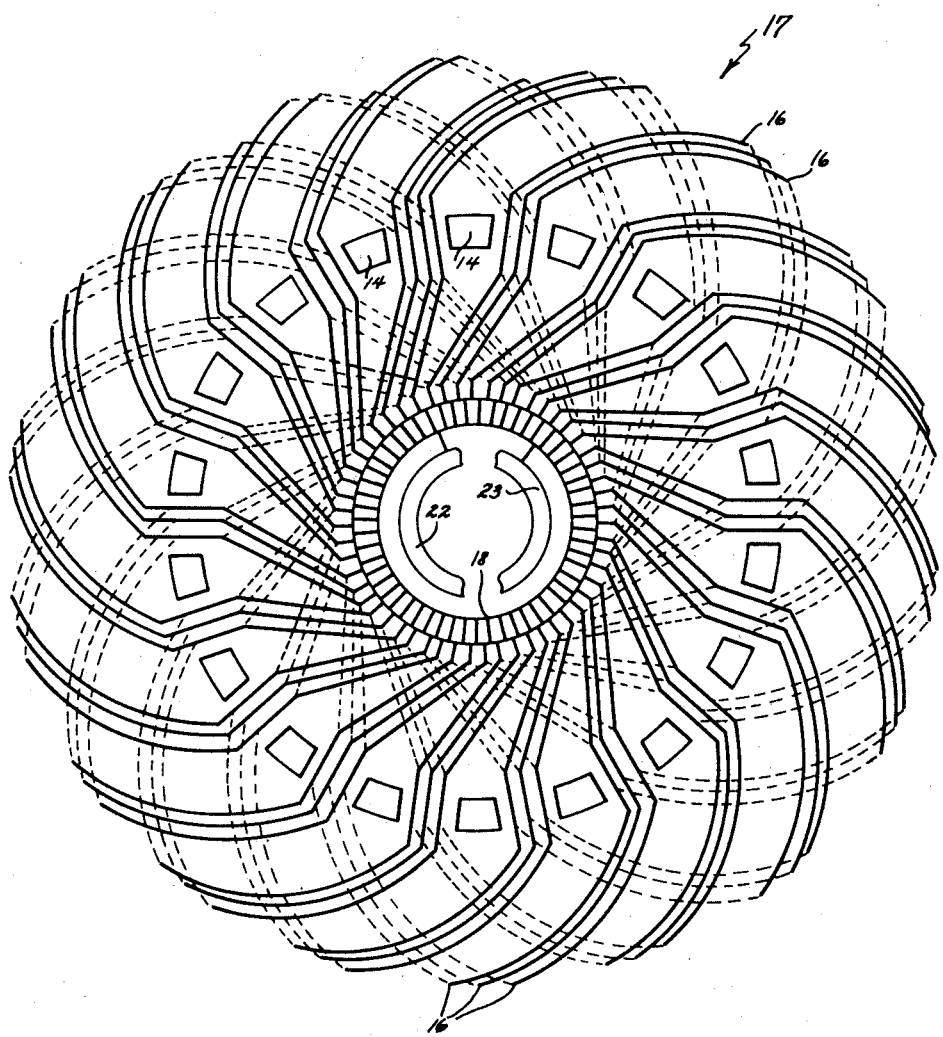
Fig. 4 is a schematic diagram of the armature of the motor.

Referring now to Fig. 1, the motor 11 contains an armature 12 mounted on the shaft 13, which shaft is mechanically connected to a load to be driven in any suitable manner, either directly or through gearing. The shaft 13 carries the armature core 14 which is built up of a number of laminations stamped from armature iron pressed on the shaft and which contain a plurality of inwardly extending radial slots 15 which receive the sides of the coils composing the armature winding 17. A commutator 18 composed of a plurality of insulated copper bars secured together in the usual way is also mounted on the shaft, as are the insulated slip rings 22 and 23.

The field structure of the motor consists of stator core 26 composed of a plurality of laminations stamped from armature iron and containing a plurality of deep radially extending slots 27 adapted to receive the sides of the coils composing the inching field winding 50 in the bottom of the slots and the sides of the coils composing the shunt field winding 40 in the upper part of the slots. The windings are held in position by well-known means. The stator core 26 is mounted in a cast iron or steel frame 28 by the methods which are well-known in the art. Attached to one side of the frame 28 is a rear end-bell 29 which carries the bearing 31 for the shaft 13 which passes through it. A front end-bell 30 is attached to the other side of the frame 28 and carries the front bearing 32 for the shaft 13, the commutator brushes 33 and 34, and the slip ring brushes 36 and 37. The arrangements of the various windings are shown in Figs. 2 and 3.

The description of the motor herein is intended to illustrate only one modification of the invention, and many changes are possible as will be understood by those skilled in the art. The present description is directed to a six-pole machine in which the armature core 14 contains 18 slots, while the commutator 18 has 55 bars, and the stator core 26 contains 36 slots. The armature winding 17 is a simplex wave winding so that only two brushes are necessary, the brushes 33 and 34 being spaced 60° apart.

The armature winding 17 is of conventional six pole simplex wave winding design and has a retrogressive pitch. It is composed of a coil per commutator bar, or 55 coils in the present design, and is designed to be fitted into the 18 slots 15 of the armature core 14. The diagram of the winding 17 is shown in Fig. 4. It should be understood that many other designs are possible.

The slip rings 22 and 23 are connected to the armature winding 17 at suitable points, 180 electrical degrees apart, so as to energize it to produce six poles which remain in a constant angular position with respect to the armature core. In the present design, the slip rings 22 and 23 are connected to bars of the commutator 18 which are separated from each other by nine bars. It will be noted that this separation is substantially equal to the brush span of the motor.

Figure 5:
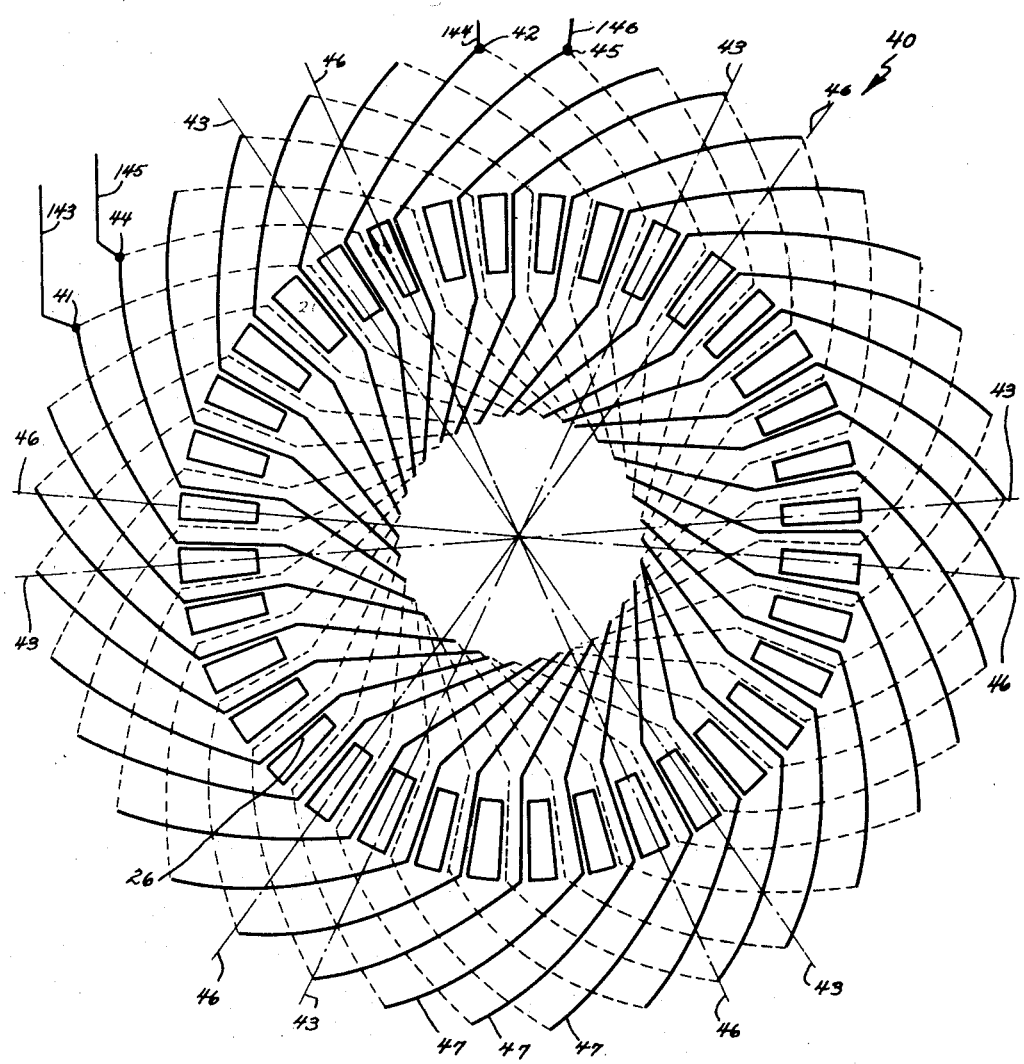
Fig. 5 is a schematic diagram of the shunt field of the motor.

The shunt field winding 40, shown in Fig. 5, is disposed in the top of the slots 27 in the stator core 26, with the "inching" winding 50 disposed in the bottom of the slots 27. The shunt field winding 40 is composed of a simplex wave winding having a coil per slot in the stator core 26, or 36 in the present design. The winding has a full pitch, and since a wave winding requires an odd number of winding elements in order to close on itself properly, two of the coils in the present winding are connected in parallel with each other. It will be understood that one coil could be omitted by a redistribution of the winding or by the use of slot fillers or dummy coils to occupy the space which would be occupied by the additional coil sides in the slots. Since such a change of design is well-known to those skilled in the art no further description will be needed.

The field of a conventional direct current motor is produced by salient magnetic poles, so that the arcuate space on the armature between the poles contains little or no magnetic flux created by the field winding. The flux distribution in a direct current motor is effected by the field structure and by the flux produced by the armature itself. The current passing through the armature winding also produces a magnetic flux approximately in quadrature with the field flux, which reacts with the field flux produced by the field winding, and causes the axis of the effective flux passing through the armature to be shifted in the direction of the armature rotation or in opposite directions as the direction of rotation is changed by reversing the direction of either the field flux or the armature current. As is well-known to those skilled in the art, it is desirable to locate the brushes of the machine on or near the neutral flux axis, so that the winding elements being short-circuited by the brushes will have a very low voltage induced therein at that instant. Since the zero flux axis in the conventional motor is broad, the brush position on the commutator is not critical, and a single brush position will suffice for both directions of rotation.

It will be appreciated by those skilled in the art that the position of minimum flux between points of opposite maximum flux density may be shifted about the armature by moving positions of the field poles relative to the armature or by shifting the brush positions relative to the armature and the field.

Where a distributed field winding as in the present invention is employed, the area of minimum flux becomes very narrow and is theoretically a line, so that a single brush position will not allow adequate commutation in both directions of rotation, and means is herein provided to shift the brush axis relative to the effective flux developed in the motor upon reversal of the direction of rotation.

By an analogy to a direct current armature of conventional design, it will be apparent that the positions of the poles produced in a closed distributed winding may be shifted by varying the points at which the winding is energized from the source of direct current power, since the winding is a closed loop of similar coils as in the case of a direct current armature. Thus, if the shunt field winding 40 shown in Fig. 5 is energized at terminals 41 and 42, six poles will be produced symmetrically disposed about the stator and having axes indicated by the dot-dash lines 43. However, if the winding 40 is energized from the terminals 44 and 45, six poles will be produced as before, but the axes of these poles will be shifted 10° to the position indicated by the dot-dash lines 46. If the brush axis is now located midway between the axes 43 and 46, the shift introduced by the taps on the field provides adequate compensation for the reaction of the armature and good commutation is obtained. Obviously, greater shifts in the commutation axis are possible by changing the energization points of the winding 40.

The inching field 50 as previously stated, is fitted into the bottom of the slots 27 in the stator core 26, and is composed of thirty-six coils 51 connected to form a closed six pole simplex lap winding. The coils 51 are of full pitch, and each coil is tapped for an external connection. Taps on coils 51 of each pole group are connected to the taps of corresponding coils in the other pole groups by means of equalizer connections 52 similar to the conventional equalizer connections on an armature. Since there are two groups of three poles of like polarity, each pole being composed of six coils, there are twelve equalizer connections each equalizer being connected to the taps on three of the coils 51 symmetrically disposed about the stator 120° apart.

The number of equalizer connections illustrated is, of course, the maximum possible number in a winding having six coils per pole and is required to secure the greatest accuracy in the operation of the "inching" circuit hereinafter described. The equalizer connections reduce the number of energization points required for the six-pole lap winding from six as would normally be required to two as will be more apparent from the description hereinafter.

Figure 6:
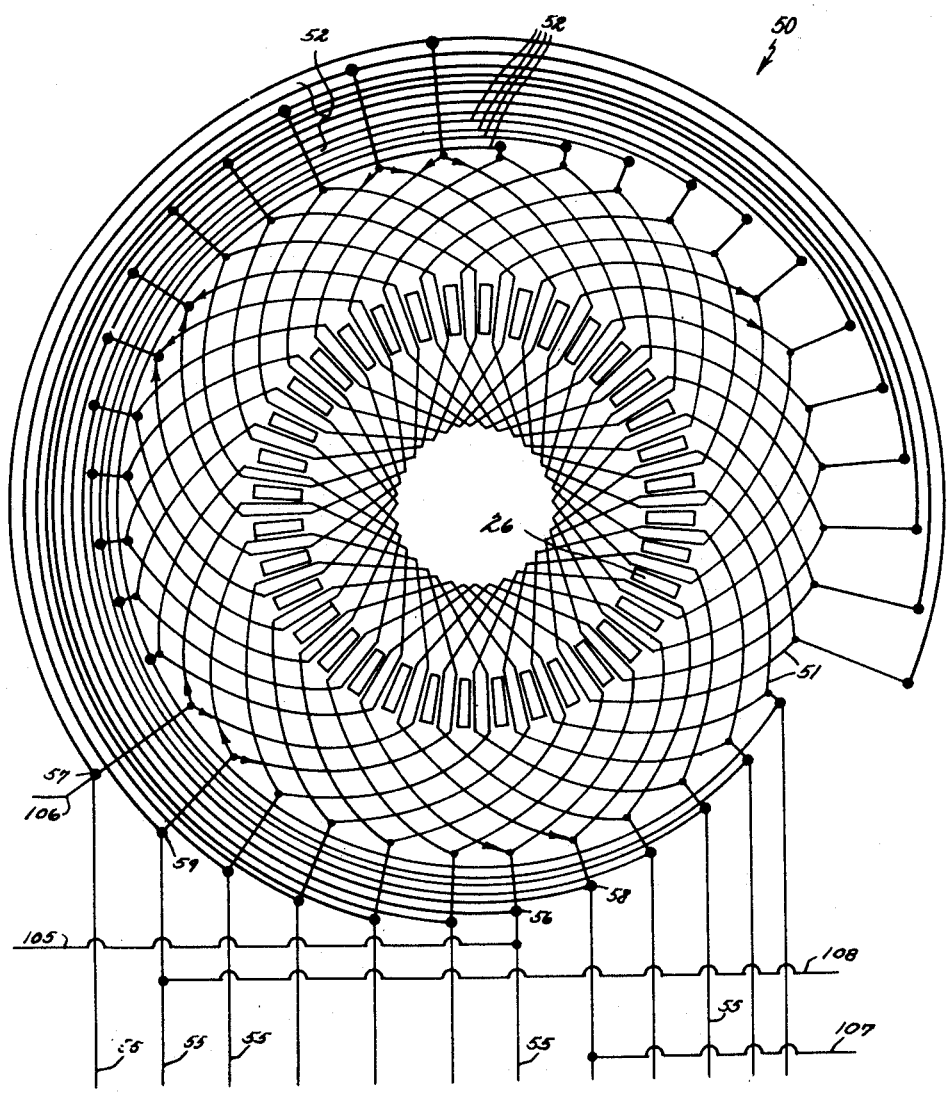
Figs. 6 and 6A are a schematic diagram of the series and inching field of the motor together with the remotely positioned commutator.
Figure 6A:
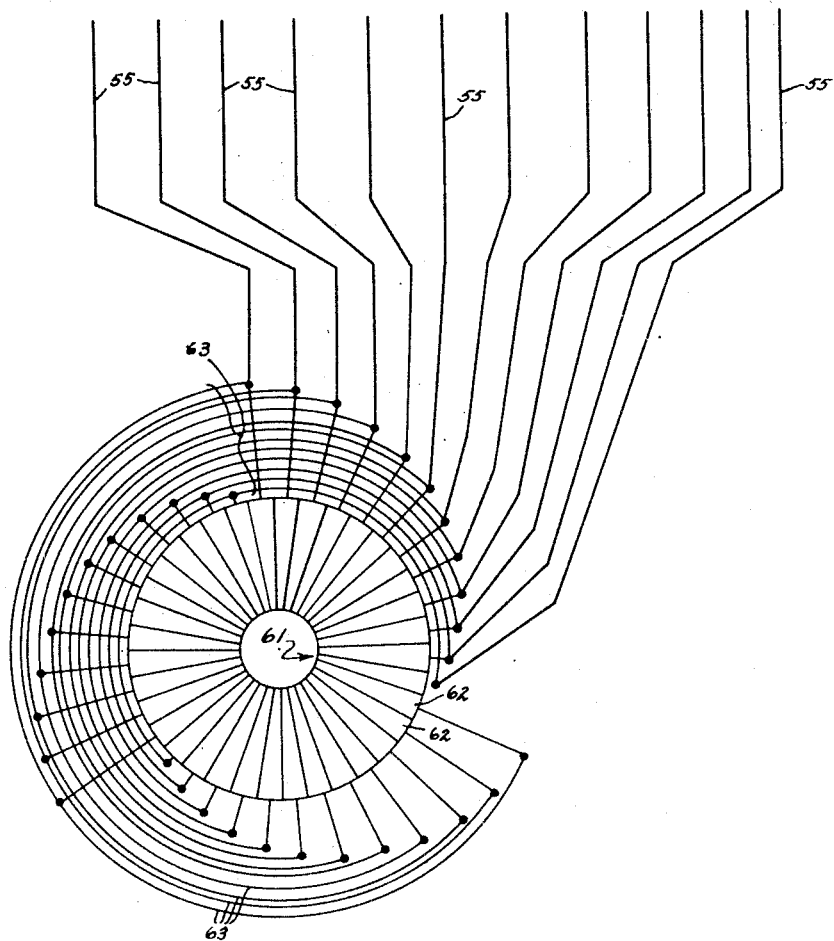

The equalizer connections 52 are connected by means of the wires 55 to the contacts of a manually operated commutator switch 60, shown in Figs. 6A and 7, which comprises a circular contact disc 61 carrying thirty-six conducting segments 62, which segments are individually insulated from each other and from the contact disc. The segments 67 are interconnected by the conductors 63 to form twelve groups of three segments each, the segments composing each group being equiangularly disposed about the contact disc 61, and the several groups connected to the equalizer connections 52 of the inching winding 50 in consecutive order.

A pair of diagonally disposed brushes 65 and 66, shown in Fig. 7, are arranged to contact the segments 62 and are connected respectively to a pair of slip rings 67 and 68. The brushes 65 and 66 and the slip rings 67 and 68 are mounted on a shaft 69 which is adapted to be revolved about the symmetrical axis of the contact disc 61 by means of the handwheel 70. A pair of brushes 71 and 72 bear on the slip rings 67 and 68 to provide electrical connections to the brushes 65 and 66 without limiting the rotation of the handwheel 70 by the use of flexible leads.

The position of the poles caused by the inching field winding 50 may be shifted with respect to the armature 12 and the frame 28 by varying the points of energization of the inching field winding by means of the handwheel 70 connected to the brushes 65 and 66, in a manner analogous to the action of commutation on a direct current armature.

In addition to its use as an "inching" field, the inching field winding 50 is also used to produce a series field for the armature 12, and thus the inching field winding 50 and the shunt field winding 40 cooperate to produce a compound field. The inching field winding 50 is energized by means of the terminals 56 and 57 when the shunt field winding 40 is energized from its terminals 41 and 42 and from terminals 58 and 59 when the shunt field winding is energized from terminals 44 and 45. Thus, the poles produced by the shunt field winding 40 and the "inching" field winding 50, now operated as a series field winding coincide when the machine is operated in continuous rotation.

It will be understood that a wave winding may be employed for the inching field winding 40, in which case no equalizer connections are needed, and the connections of each coil may be brought out to the commutator switch. The exact connections and the number of brushes operated by the handwheel 70 will depend upon the design of the motor including the number of poles and the type of winding employed in the particular installation. A number of modifications will be apparent to those skilled in the art.

Referring now to Fig. 7, a forward relay 90 having six contacts is arranged to connect the motor for continuous rotation in a forward direction, and a reverse relay 80 also having six contacts is adapted to connect the motor for continuous rotation in a reverse direction. Speed control of the motor is accomplished by applying different voltages to the armature, which voltages are secured by means of the tapped resistance 100 and its associated relays. Since the armature winding 17 shown in Fig. 4, is arranged to be selectively energized either through the commutator 18 or through the slip rings 22 and 23, it is important that one energization circuit for the armature be completely isolated from the circuit when the other energization circuit is connected to a source of power. Similarly, the inching field winding 50 must be energized exclusively through either the terminals 56 and 57 or the terminals 58 and 59 when the motor is operated in continuous rotation, or through the commutator switch 60 when the motor is used for inching. Similarly, the shunt field winding 40 must be energized through either the terminals 41 and 42 or the terminals 44 and 45 when the motor is operated in continuous rotation and must be completely disconnected from the circuit when the motor is employed for "inching."

The operation of the motor system herein described is controlled by means of the drum controller 110 and the commutator switch 60, shown in Fig. 7. These controls are placed in a location which is convenient for the operator and may be located at a considerable distance from the motor if it is found desirable.

The diagram shown in Fig. 7 is simplified for clarity by reducing the number of coils in the shunt field winding 40 and the inching field winding 50 to twelve in each. It will be understood by those skilled in the art that each loop shown in the inching field winding 50 indicates three coils connected in parallel, the coils being situated 120° apart about the stator core 26, and that each loop shown in the shunt field winding 40 represents three coils connected in series with each other and situated 120° apart about the stator core 26. Similarly, the conductors 55 are shown cabled together, since the wiring of the inching field winding 50 and the commutator switch 60 is shown in Figs. 6 and 6A.

Assuming now the drum controller 110 is moved to the position indicated as Forward I, current flows from the positive bus bar 120 to the contact 111 on the drum controller 110, which is now in contact with the segment 111a, and hence is connected to all the segments on the controller. The contact 112 is in contact with the segment 112a connected with the actuating coil 91 of the relay 90 by means of the wire 121. The other side of the actuating coil 91 is connected to the negative bus bar 119, so that the current now flowing through the actuating coil 91 causes the relay to close its normally open contacts.

The contact 113 on the drum controller 110 engages the segment 113a and hence a circuit is completed for the relay 101 through the wire 122 to one side of the actuating coil 101b, the other side of which is connected by the wire 123 to the negative bus 119. This relay then closes its contacts 101a.

The motor is now energized and runs at a low speed through the following circuits. The brush 34 on the armature 12 is connected by the wire 124 to the wire 126 and thence through the now-closed contacts 90b of the relay 90 to the wire 125 which is connected to the negative bus 119. Terminal 100a of the tapped resistance 100 is connected to the wire 126 by means of the wires 137, 142, and 127, while the terminal 100d of the resistance 100 is connected by wire 128, wire 129, and the contacts 90a to the wire 130 which is connected to the positive bus 120. The brush 33 on the armature 12 is connected by the wire 131 to the wire 132 and thence through the now-closed contacts 90e of the relay 90 by way of connector 108 to the terminal 59 of the inching field winding 50. The terminal 58 of the inching field 50 winding which is used as a series field winding, through the contacts 90f to the wire 133 and thence by the wires 134 and 135 to the contacts 101a of the relay 101 and the tap 100b on the resistance 100. The armature 12 is therefore connected in series with the inching field winding 50 and energized from the voltage across the portion of the resistance 100 between the terminals 100a and 100b.

The shunt field 40 is energized as follows: Current flows from the positive bus 120 to the wire 130, through the contacts 90a to the wires 129 and 141 to the wire 136 and the contacts 90c of the relay 90, and thence by wire 146 to the terminal 45 of the shunt field winding 40. The terminal 44 of the shunt field winding 40 is connected by wire 145 to the contacts 90d of the relay 90, wire 142, wire 137, wire 126, contacts 90b, and wire 125 to the negative bus 119.

If the drum controller 110 is now moved to the position shown in Forward II, the contact 113 is separated from the segment 113a, thus de-energizing the relay 101 which opens its contacts 101a, while the contact 114 connects with the segment 114a completing the circuit for the relay 102, while the remaining circuits remain the same. Current now flows through the contact 111 to the segment 111a and thence through the segment 114a and the contact 114 and the wire 138 to the actuating coil 102b, the other side of which is connected by the wire 123 to the negative bus bar 119. The armature 12 and the inching field 50 are now connected across the portion of the resistor 100 between the terminals 100a and 100c, thus receiving a larger voltage than before and the motor now operates at a higher speed which is determined by the setting of the tap 100c on the resistor 100.

If the drum controller 110 is moved to the Forward III position, the relay 102 is de-energized and the relay 103 is energized by contact 115, segment 115a, wire 139, actuating coil 103b and wire 123 to the negative bus bar 119 leaving the other connections unchanged. The armature 12 in series with the inching winding 50 is now connected directly between the positive bus 120 and the negative bus 119 and the motor runs at the maximum speed allowed by the load and the effective strength of the combined fields.

If it is desired to operate the motor in the reverse direction, the drum controller 110 is moved to the Reverse I position. The relays previously energized drop out and the relay 80 is pulled up by the connection from the positive bus 120 through the contact 111, the segment 111c, the segment 116c, the contact 116, wire 140, and through the energizing coil 81 to the negative bus 119. The relay 101 is pulled up by the circuit from the positive bus 120, contact 111, segment 111c, segment 113c, contact 113, wire 122, actuating coil 101b, and wire 123 to the negative bus 119.

The armature circuit is now energized from the positive bus 120, wire 130, contacts 80a, wire 129, wire 128 to the terminal 100d of the resistor 100, through the resistor 100 to the tap 100b, contact 101a, wire 135, wire 134, wire 133, contacts 80f, wire 106, terminal 57 of the inching field 50 and through the inching field to terminal 56, wire 105, contacts 80e of relay 80, wire 132, wire 131, brush 33, armature 12, brush 34, wire 124, wire 126, contacts 80b and wire 125 to the negative bus 119. The direction of the current flow through the armature is the same as when the armature is energized in the forward direction of rotation, while the armature voltage and hence speed is controlled by the resistor 100 and the relays 101, 102, 103 in the same manner for both directions of rotation but the current flow through the inching field 50 and the shunt field winding 40 is reversed and the pole positions are shifted to the reverse field position.

The shunt field winding 40 is energized from the position bus 120 through the wire 130, contacts 80a, wire 129, wire 141, wire 136, contacts 80c, wire 143, terminal 41 of the shunt field winding 40 and through the shunt field winding 40 to the terminal 42, wire 144, contacts 80d, wire 142, wire 137, contacts 80b, and wire 125 to the negative bus 119. It will be noted that the direction of current flow is reversed through winding 40, and the pole positions are also shifted for rotation in the reverse direction.

Movement of the drum controller 110 to the position indicated as Reverse II causes relay 101 to drop out and relay 102 to pick up and connect the armature 12 and the inching field 50 to a higher potential by means of the contact 102a. The circuit of relay 102 extends from the positive bus 120, contact 111 on the drum controller 110, segment 111c, segment 114c, contact 114, wire 138, actuating coil 102b, and wire 123 to the negative bus 19. The controller, in the position Reverse III, causes the relay 103 to pick up through the circuit from segment 116c, contact 116, wire 139, actuating coil 103b and wire 123 to the negative bus 119, thus closing its contacts 103a and applying the full voltage to the armature.

When the drum controller 110 is moved to the position marked "Off," the relays 80, 90, 101, 102, and 103 are de-energized and remain in their normally open positions, thus isolating all the motor elements from each other and from the positive and negative buses.

When the drum controller 110 is in the position marked "Inch," the previously discussed circuits remain de-energized and the relay 150 is energized to close its normally open contacts 150a, 150b, 150c, and 150d. The actuating circuit for relay 150 extends from the positive bus 120 to the contact 111, segment 111b, segment 117b, contact 117, wire 155 and through the actuating coil 151 to the negative bus 119.

The armature winding 17 shown in Fig. 4 on the armature 12 is now energized through a fixed path by means of the slip rings 22 and 23 and becomes in effect an electromagnet having six poles in a fixed angular relationship relative to the armature 12. The inching field 50 is energized through the commutating switch 60 and produces six poles whose angular positions relative to the frame of the machine are determined by the angular position of the brushes 65 and 66 relative to the contact disc 61, and whose positions, as previously discussed, may be changed by changing the angular position of brushes 65 and 66 by means of the handwheel 70.

The armature 12 and the inching field 50 are energized in series by a circuit extending from the positive bus 120 through the contacts 150a, the resistance 156, wire 160, brush 37, slip ring 23, winding 17 on armature 12, slip ring 22, brush 36, wire 161, contacts 150b, wire 162, contacts 150c, wire 163 to the brush 71, the slip ring 67, wire 73 to the brush 66, and contact disc 61 which is connected to the inching field winding 50 by the conductors 55 as previously explained. The brush 65 in contact with the contact disc 61 completes the circuit through the wire 74, slip ring 68, brush 72, the wire 164 to the contacts 150d and thence to the negative bus 119.

The resistance of the armature winding 17 is very low, as is the resistance of the inching field winding 50, so that the full line voltage cannot be continuously applied to these elements without serious overheating. To reduce the current flow to a safe value, these elements are connected in series with each other and with the resistance 156. Since the limiting factor for satisfactory operation of the motor is the temperature rise produced by the current and since it has been found that the inching field winding 50 is capable of withstanding higher currents without overheating than the armature winding 17 can withstand, a resistance 157 is connected in parallel with the armature winding 17 to provide a shunt path for a portion of the current passing through the inching field winding 50. The resistance 157 is disconnected from its shunt connection across the armature winding 17 when the relay 150 is de-energized because it is connected by the wire 165 between wire 160 from the slip ring 23 and to the wire 162 which is separated from the wire 161 by the contacts 150b of the relay 150.

The inching circuit operates as follows:

As previously discussed the armature 12 becomes a rotatable magnet having six poles, and the inching field winding 50 produces a six pole field which may be shifted relative to the motor frame 28 by shifting the position of the brushes 65 and 26 relative to the contact disc 61 by means of the handwheel 70. The magnetic poles produced by the armature align themselves with the poles produced by the inching field, so that the armature moves the same angular distance that the handwheel 70 is turned.

It will be obvious to those skilled in the art that many changes and modifications may be made in the present device. The types of winding used in the motor may be changed from simplex to multiplex, and from lap windings to wave winding and vice versa. The number of poles may be changed to suit a particular use, as may the frame and its mounting brackets.

A field rheostat may be inserted in series with the shunt field winding 40 to adjust the running speed of the motor. If a field rheostat is desired it may be inserted in the circuit interconnecting the wires 129 and 136 in the place of wire 141.

It will be understood that the direction of rotation of the motor may be reversed by reversing the direction of the current flow through the armature while leaving the polarity of the field unchanged, instead of reversing the polarity of the field as is shown herein. The types of relays shown are illustrative only, and any desired type may be employed, the selection being only a design problem.

If it is desired to do so, the relays shown may be eliminated by the proper design of the drum controller 110 to serve the combined function of the illustrated drum controller and relays. In certain installations, wherein the equipment is subject to severe shocks, such a design would be desirable, since a drum controller is inherently shock-proof and no other parts of the installation would require shock-proofing if the relays were eliminated.

The commutating switch 60 may take any desired form. It may be constructed cylindrical as in the conventional motor commutator or in other convenient form. Those skilled in the art will appreciate that the equalizer connections 52 and 63 may be omitted and the connections to each of the coils 51 brought out to the commutator switch 60, in which case the commutator switch must be fitted with an appropriate number of brushes, the number depending upon the type of winding used and the number of poles in the motor.

The motor may, of course, be designed as a series motor instead of a compound motor by proper design of the inching field winding 50, if desired. It is also evident that the inching field winding may be designed to withstand the line voltage and used as a shunt field either with or without a series field winding.

The invention described herein may be manufactured and used by or for the Government of the United States of America for governmental purposes without the payment of any royalties thereon or therefor.

Having thus described the invention, what is claimed is:

1. In a direct current machine, a slotted stator core containing a longitudinal bore, a distributed closed winding disposed in said slots and having a first pair and a second pair of terminals connected to said winding so as to cause said winding to produce, when connected to a source of direct current through said pairs of terminals, magnetic poles of alternate polarity with minimum flux positions therebetween in predetermined first positions and predetermined second positions respectively, determined by the electrical positions of the pair of terminals connected to said source of direct current, an armature rotatably disposed within said bore, an armature winding on said armature, a commutator carried on said armature and connected to said armature winding, brushes on said commutator, said brushes being disposed on said commutator in electrical positions substantially mid-way between the minimum flux positions in said predetermined first positions and the minimum flux positions in said predetermined second positions, whereby the commutation axis of the machine is shifted relative to the flux produced by said closed distributed winding when the direct current source is shifted from said first pair of terminals to said second pair of terminals.

2. In a direct current motor system, a slotted stator core containing a longitudinal bore, a first and a second closed distributed windings each having two pairs of taps thereon and arranged when energized from a source of direct current through said pairs of taps to produce magnetic poles with minimum flux positions there-between in angular positions relative to said stator core determined by the electrical positions of said taps on said windings, said taps including a first pair and a second pair of taps connected individually and respectively to said first and said second closed distributed windings to cause said windings to individually produce said magnetic poles in predetermined first angular positions when said first and second pairs of taps are connected to a source of direct current and a third pair and a fourth pair of taps connected respectively and individually to said first and said second closed distributed windings to cause windings to produce said magnetic poles in predetermined second angular positions when said third and fourth pairs of taps are connected to a source of direct current, an armature rotatably disposed within said bore and having an armature winding thereon, a commutator carried by said armature and connected to said armature winding, brushes on said commutator, said brushes being electrically positioned on said commutator substantially midway between said minimum flux positions in said predetermined first positions and said predetermined second positions, first switch means to connect said first closed distributed winding through said first pair of taps to a source of direct current and to connect said second closed distributed winding through said second pair of taps in a series circuit with said armature winding through said brushes, and to connect said series circuit to said source of direct current to produce rotation in a first direction, and second switch means to connect said first closed distributed field winding through said third pair of taps, said second means also connecting said second distributed winding through said fourth pair of taps in a series circuit with said armature winding through said brushes and connecting said series circuit to said source of direct current to produce rotation in a second direction, whereby the commutation axis of the machine is shifted when the direction of rotation is reversed.

3. In an electric motor system, a slotted stator core containing a longitudinal bore, a closed distributed winding having a plurality of taps thereon disposed in said slots for producing when energized through said taps magnetic poles in angular positions determined by the taps so energized from source of direct current, a commutator switch having a number of fixed conducting segments equal to the number of said taps, individualized and consecutive connections from said taps to said conducting segments, manually movable brushes arranged to contact said conducting segments, an armature core having thereon a winding for producing magnetic poles, means for energizing said armature winding from a source of direct current, and means for energizing said closed distributed field winding through manually movable brushes from a source of direct current, whereby the distributed field winding produces said magnetic poles in positions relative to said stator core determined by the position of said movable contacts on said fixed segments so that the armature moves to a corresponding position with respect to the stator core.

4. An electric motor system comprising a slotted stator core containing a longitudinal bore, a closed distributed winding fitted within said lots having plurality of equispaced taps disposed about said winding, said winding producing when energized through said taps magnetic poles of alternate polarity with minimum flux positions therebetween in angular positions determined by position of said taps, an armature rotatably disposed coaxially within said bore, an armature winding on said core for producing magnetic poles, a commutator carried by said armature and connected with said armature winding with brushes thereon, slip rings carried by said armature and connected to said armature winding to cause said winding to produce magnetic poles in a fixed relation to said armature core, a commutator switch having a number of fixed segments equal to the number of taps on said closed distributed field winding individually and consecutively connected to said taps, movable contacts cooperating with said fixed segments to vary the angular positions of said magnetic poles relative to said stator core in accordance with the position of said movable contacts relative to said fixed segments, terminals connected with certain of said taps to produce said magnetic poles with minimum flux positions therebetween in a predetermined angular position relative to said stator core, first means for connecting said terminals and said commutator brushes to a source of direct current to produce continuous rotation, and second means to connect said slip rings carried by said armature and said movable contacts to a source of direct current to cause said armature to continuously align its magnetic poles with those produced by said closed distributed field winding, the position thereof being determined by the position of said movable contacts relative to said segments.

5. An electric motor comprising a slotted stator core containing a longitudinal cylindrical bore, a distributed closed winding within said slots having a plurality of taps connected at spaced points about said winding adapted to be selectively energized from a source of direct current so as to produce magnetic poles of alternate polarity with minimum flux positions therebetween and in angular positions relative to said stator core determined by the taps so energized, a commutator switch having a number of stationary segments equal to the number of taps on said field winding, each of said taps being connected to an individualized segment on said switch, manually movable contacts cooperating with said stationary contacts and adapted to be connected with a source of direct current, a second distributed closed winding in said slots in said stator having a first pair and a second pair of terminals connected with said second distributed winding so as to produce magnetic poles of alternate polarity with minimum flux positions therebetween in first and second predetermined angular positions relative to said stator core when energized through said pairs of taps from a source of direct current, said first predetermined position being displaced from said second predetermined position, a third pair and a fourth pair of terminals connected with certain of said taps on said first distributed winding to cause said winding when energized from a source of direct current through said pairs of terminals coincident with the magnetic poles produced by said second distributed winding when energized from said first pair and said second pair of terminals respectively, a direct current armature having an armature winding thereon for producing magnetic poles and a commutator thereon, said armature being rotatably supported coaxially within said bore, a pair of slip rings carried on said armature and connected to said armature winding so as to produce the magnetic poles in fixed positions relative to said armature when energized therethrough by direct current, commutator brushes bearing on said commutator and secured in an electrical position midway between the minimum flux positions in first predetermined position and the minimum flux positions in said second predetermined field position, first means to connect said second distributed closed winding by means of said first pair of terminals to a source of direct current and to connect a first series circuit composed of said first closed distributed field winding through said third pair of terminals and said armature through said commutator brushes to said source of direct current whereby the motor operates as a compound motor in a first direction, second means for connecting said second distributed winding by connections to said second pair of terminals to a source of direct current and to connect a second series circuit composed of said first distributed field winding by connections to said fourth pair of terminals and said armature by connections to said commutator brushes to a source of direct current, whereby the motor operates as a compound motor in a second direction, and third means to connect said armature winding through said slip rings and said first distributed closed winding through said movable contacts to said source of direct current whereby the armature aligns its magnetic poles with the magnetic poles produced by said first distributed winding, said positions being determined by the position of said movable contacts relative to said fixed contacts.

MARTIN J. ROSE.

REFERENCES CITED

The following references are of record in the file of this patent:

UNITED STATES PATENTS

| Number | Name | Date |
| --- | --- | --- |
| 774,943 | Jackson | Nov. 15, 1904 |
| 1,095,586 | McCollum | May 5, 1914 |
| 1,401,996 | Lundell | Jan. 3, 1922 |
| 2,403,665 | Lewis | July 9, 1946 |

FOREIGN PATENTS

| Number | Country | Date |
| --- | --- | --- |
| 14,175 | Great Britain | of 1911 |